Figure 4:
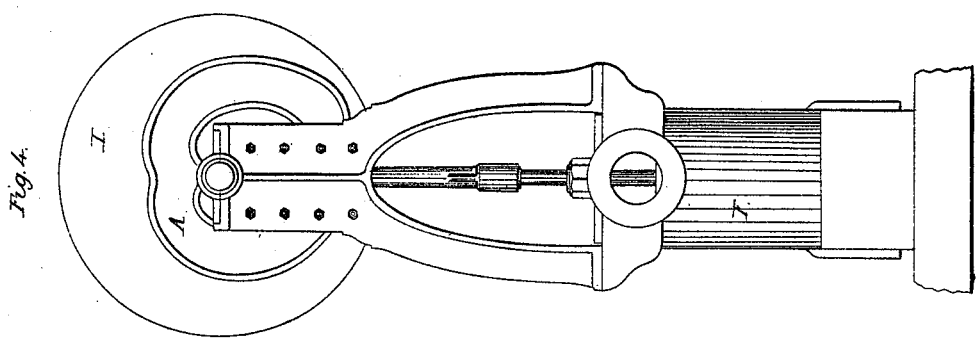

Sheet 1 - 2 Sheets.
Dickerson & Root,
Double-Acting Pump.
Nº 14,186. Patented Feb. 5, 1856.
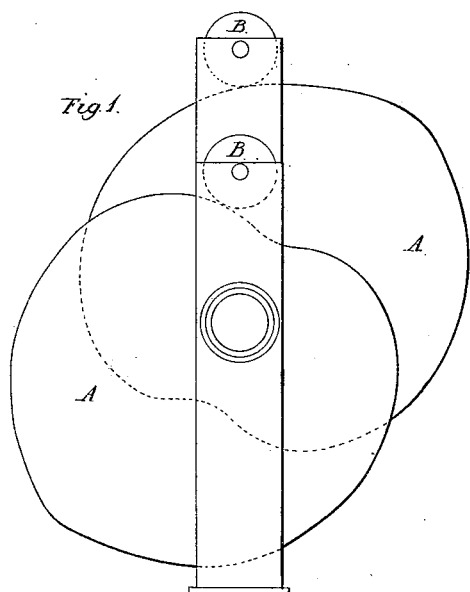
Fig. 1.
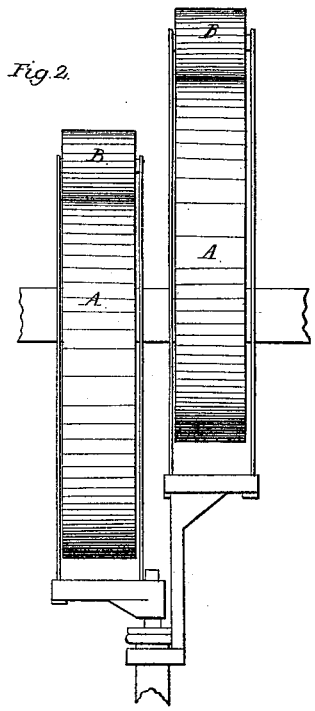
Fig. 2.
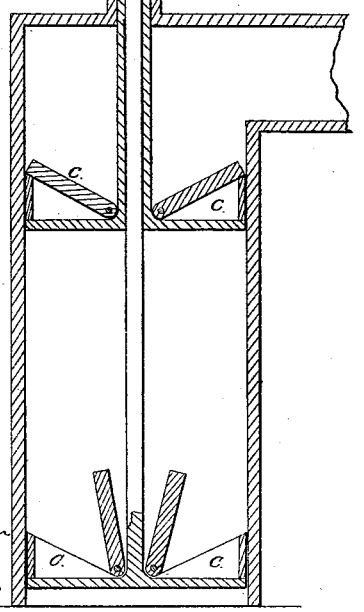
Witnesses:
Inventor:
Edwd N. Dickerson
E. K. Root

Dickerson & Root,
Double-Acting Pump.

N° 14,186. Patented Feb. 5, 1856.

Witnesses:

Inventor:
Edw. N. Dickerson
E. K. Root

UNITED STATES PATENT OFFICE.

EDWARD N. DICKERSON, OF NEW YORK, N. Y., AND ELISHA K. ROOT, OF HARTFORD, CONNECTICUT.

PUMP.

Specification of Letters Patent No. 14,186, dated February 5, 1856.

*To all whom it may concern:*

Be it known that we, EDWARD N. DICKERSON, of New York city, and ELISHA K. ROOT, of Hartford, Connecticut, have invented a new and useful Improvement in Pumps; and we do hereby declare the following to be a full and exact description thereof, reference being had to the accompanying drawings.

A problem which has occupied much of the attention of engineers is that of the conversion of the rotary motion of the shafts of steam engines or water wheels, into the progressive motion of a rising column of water, without any loss of power by irregular motion, or any shock or concussion to the pumps or the water; but until our invention it never has been solved. The difficulties which have prevented this result, are, either the irregular motion of the pump buckets or plungers whereby the speed of the column is constantly varied; or the total cessation of motion at the termination of each stroke, of the water through the pump, whereby the momentum of the column is diminished or lost, requiring an expenditure of power to restore it, generally resulting in a slamming of the valves and a concussion to the whole mechanism; or both of these causes combined. These difficulties have been found so great up to the time of our invention, that a single acting Cornish engine, without a crank, is very generally preferred on the score or economy of fuel to any combination of a reciprocating steam engine having a rotating shaft, with reciprocating pumps; although it is well established that a higher duty can be obtained from a given amount of fuel by the use of a reciprocating rotating engine than by a Cornish engine for any other purpose than lifting water.

Our improvement consists in imparting to the column of water to be moved, a perfectly uniform and constant motion, by means of the buckets of a reciprocating pump deriving their motion through a rotary shaft, and requiring no aid from an air vessel or other analogous device; and we accomplish this result by moving the buckets themselves, when engaged in impelling the water, with a uniform speed, and so combining them that there is no instant of time when one or the other or both are not impelling the water with a uniform and constant motion.

Two buckets only are necessary to accomplish the result perfectly. The motion is transferred from the rotary shaft to the buckets by a cam, whose shape is such that it lifts the bucket upon which it is acting with a uniform speed. A true spiral is the proper shape of the rotating cam in order to produce a uniform lift, but this is only true when the bucket is suspended by a narrow edge of metal under which the perimeter of the cam slides; but when the bucket is suspended to the journals of a roller which it always ought to be to save friction, the true spiral form of the cam is somewhat modified by the size at which the roller is fixed; and therefore in laying down the shape of the cam for the pattern maker, the true spiral line should be first laid down at as much greater a distance from the center of the cam-shaft than the perimeter of the cam is to be, as the radius of the roller designed to be used; and the true perimeter of the cam will then be ascertained by measuring inward from that line a distance equal to the radius of the roller. The true spiral which is to lift the bucket should be carried a little farther than half the revolution of the cam, and then the curve should be modified, gradually approaching a circle and then gradually reflected onward, so as to permit the roller to descend to the starting point upon a reversed spiral which occupies less than half the perimeter of the cam. By applying such a cam as described to the bucket of an ordinary lifting pump, it is evident that it would lift the water in that pump with uniform velocity for more than half its revolution, but for the remainder of the revolution the bucket would either be rising with a diminishing speed or be descending, and the water in the pump would cease to rise—or in other words the motion would be uniform as long as it continued, but it would not be constant. A constant, as well as a uniform velocity however is necessary; and that we obtain by combining two buckets into one pump, each driven by a spiral cam such as described, and so arranged that the column of water shall pass through both in succession. The effect of this combination is that the water which the lower of the two buckets is driving with uniform speed is passing through the upper one which is descending to renew its stroke, and whose valves are therefore open; and before the lower bucket ceases to drive the water the upper one has descended, commenced its ascent, and has overtaken the current in which it moves, so that its valves are closed and it is moving upward at the uniform speed designed, and dividing the load with the lower bucket; the speed of the lower bucket is then gradually diminished, as the modified end of the spiral curve passes under the roller which sustains it, and the entire load of the column is insensibly transferred from the lower to the upper bucket without causing the least variation in the speed of the column of water or in the power required to drive it, or the least slam or jar in the valves whose opening and closing is made as gradual as desired by gradually compounding the curves on the cam which connect the spirals of ascent and descent.

The accompanying drawings exhibit two of the forms in which we have embodied our invention; but those may be varied at pleasure without changing the principle of action so long as two moving buckets are used, deriving a uniform and constant motion through a rotating shaft and uniform lifting cams, and so arranged that each one will start to lift the water passing through both in succession at or before the instant when the other ceases to lift it.

Plate 1, Figure 1, represents a pump in action. A A are the two revolving cams, constructed to lift the buckets C C by means of the rollers B B. The lower bucket, which is descending with its valves open, is operated by a piston rod which passes through the hollow piston rod of the upper bucket which is rising and driving the water. The atmospheric pressure drives the water through the lower bucket and keeps it in contact with the lower side of the upper one. The cams are fixed upon the shaft with their corresponding points opposite each other diametrically, and the shaft is rotated by a stem engine or water wheel or other power.

Figure 5:
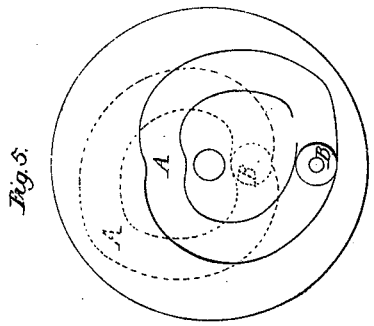
Figure 3:
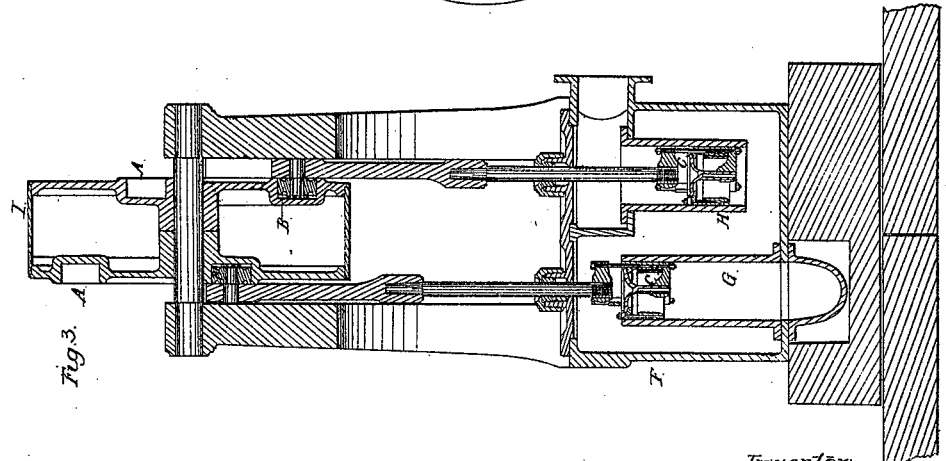

Plate 2, exhibits the same invention in another form. In place of working the two buckets in the same cylinder, the one above the other, they are worked in two cylinders set parallel with each other, which together constitute one pump, and which are connected by means of the chest F whose only office it is to convey the water which has already passed through the first section of the pump G to its second section H. Fig. 4 is an elevation of Fig. 3, showing its end view, and exhibiting the manner in which the cams may be supported and driven—the drum I serving as a pulley for a belt at the same time that its ends contain the cams for driving the buckets of the pump. Fig. 5 shows the cams A A and the roller B B. When the pump is divided into two sections as in Plate 2, and for the sake of compactness the bottom of one is placed lower than the top of the other, an escape cock for air should be placed in the bonnet of the first section so as to permit the air to escape from between the buckets. And in order to pass the water through the pump with the greatest possible facility side pipes may be added having valves opening upward, through which a part of the water might pass upward around the descending buckets, while the main column continued to pass through them; or the whole column might pass through the side pipes making the buckets without valves, which would be in effect the same thing as passing it through the buckets themselves, as it would be only another form of valve for transferring the water from their lower to their upper sides in order that they may lift it after it is so transferred. But it is better to make the pumps large enough, and to move them slowly enough, to need no aid from such auxiliaries; and the calculation for determining the size of the pump for any given case ought to assume a speed of not more than a foot a second through the pump itself.

It will be obvious from the foregoing description that while absolute perfection in the constancy and uniformity of the motion of the water can only be had by the use of buckets which shall lift with uniform velocity yet that slight variations may be made without materially affecting the operation; and that one cam may be used to drive both buckets, by applying the two rollers to opposite points on its perimeter as is done on the water works pumps at Hartford constructed on the plan herein described; and that the prime rotary motion may be converted into the described and desirable reciprocating motion of the buckets by the intervention of elliptical gearing producing the same uniform motion in the water as the spiral cam does, or by helical cams or tilting disks producing uniform motion, without changing our mode of operation. And while two buckets have the capacity when combined in the manner invented by us to produce absolute and mathematically perfect uniformity and constancy of motion, it is manifest that three or more might be used, dividing the work and the motion equally among them without changing the principle of our invention and without making the machine much worse. It is also apparent that if two separate lifting pumps were used, delivering into a common main, a very good result might be obtained by combining their buckets with two cams which should lift them with uniform speed and at the same time be so arranged as to lead each other, so that one would begin to lift before the other had ceased its motion; which arrangement would embody so much of our invention as is contained in the lead or lap of the cams upon each other when combined with the buckets of pumps. And it is also apparent that where the column of water passes through both buckets in succession and is therefore not required to stop in any part of its length, the lead of the cams may be taken off. We make these suggestions, not in the expectation that any one will prefer to use any of these inferior means of carrying out our invention when they may lawfully use the better ones fully described by us, but for the purpose of showing that we are not ignorant that there are many forms in which our invention may be embodied without substantially changing its character, and that we seek the protection of the law as well against the unauthorized use of our invention in its most imperfect as in its most perfect form.

It is not our intention to claim either double bucket pumps, or the use of cams for driving pumps, as both of these things are old; nor do we claim to have invented anything but a new mode of operation, which we have reduced to practice by the employment of old and well known parts or elements combined into a new combination or arrangement. But What we do claim as our invention, and desire to secure by Letters Patent is—

1. Two buckets working in pump barrels so arranged that the column to be raised passes through both in succession, in combination with spiral cams or their equivalents so arranged as to move said buckets with uniform velocity, and to maintain practically a uniform and constant lifting action upon the water, substantially in the manner described.

2. Imparting to the column of water, by means of a reciprocating pump, a constant and uniform flow through the ascending main, substantially as herein described.

EDWD. N. DICKERSON.
E. K. ROOT.

Signed in the presence of—
R. E. STILWELL,
A. G. RANNEY.